United States Patent
Song et al.

(10) Patent No.: US 7,731,837 B2
(45) Date of Patent: Jun. 8, 2010

(54) OXIDATIVELY REGENERABLE ADSORBENTS FOR SULFUR REMOVAL

(75) Inventors: Chunshan Song, State College, PA (US); Xiaoliang Ma, Port Matilda, PA (US); Shingo Watanabe, State College, PA (US); Fuxia Sun, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 150 days.

(21) Appl. No.: 11/899,964

(22) Filed: Sep. 7, 2007

(65) Prior Publication Data

US 2009/0065400 A1  Mar. 12, 2009

Related U.S. Application Data

(60) Provisional application No. 60/842,938, filed on Sep. 8, 2006.

(51) Int. Cl.
  *C10G 29/00*  (2006.01)

(52) U.S. Cl. .................. 208/208 R; 208/243; 208/244; 208/299

(58) Field of Classification Search ............. 208/208 R, 208/243–244, 248–249, 299; 423/244.01–244.02
See application file for complete search history.

(56) References Cited

U.S. PATENT DOCUMENTS

| | | | |
|---|---|---|---|
| 4,001,375 A | 1/1977 | Longo | |
| 4,206,036 A | 6/1980 | Takeuchi et al. | |
| 4,251,496 A | 2/1981 | Longo | |
| 4,346,063 A | 8/1982 | Cahn et al. | |
| 4,369,108 A | 1/1983 | Bertolacini et al. | |
| 4,381,991 A | 5/1983 | Bertolacini et al. | |
| 4,423,019 A | 12/1983 | Bertolacini et al. | |
| 4,537,873 A | 8/1985 | Kato | |
| 4,626,419 A | 12/1986 | Lewis et al. | |
| 4,885,145 A | 12/1989 | Kay et al. | |
| 5,024,985 A | 6/1991 | Koberstein et al. | |
| 6,105,365 A | 8/2000 | Deeba et al. | |
| 6,214,306 B1 * | 4/2001 | Aubert et al. | ............ 423/213.2 |
| 6,422,005 B2 | 7/2002 | Dolling et al. | |
| 6,941,742 B1 | 9/2005 | Neufert et al. | |
| 7,074,375 B2 | 7/2006 | Lampert et al. | |
| 7,166,263 B2 | 1/2007 | Vanderspurt et al. | |
| 2001/0023585 A1 | 9/2001 | Dolling et al. | |
| 2002/0044901 A1 | 4/2002 | Wilson et al. | |
| 2003/0186805 A1 | 10/2003 | Vanderspurt et al. | |
| 2003/0235526 A1 | 12/2003 | Vanderspurt et al. | |
| 2005/0098478 A1 | 5/2005 | Gupta et al. | |
| 2005/0150819 A1 | 7/2005 | Wachs | |
| 2005/0271913 A1 * | 12/2005 | Takatsu et al. | ................. 429/19 |
| 2006/0108262 A1 | 5/2006 | Takatsu | |
| 2006/0210462 A1 * | 9/2006 | Larcher et al. | ........... 423/213.2 |
| 2007/0093382 A1 | 4/2007 | Vanderspurt et al. | |

FOREIGN PATENT DOCUMENTS

WO  WO 2006/052997  *  5/2006

* cited by examiner

*Primary Examiner*—Robert J Hill, Jr.
*Assistant Examiner*—Brian McCaig
(74) *Attorney, Agent, or Firm*—Law Offices of John A. Parrish

(57) ABSTRACT

Compositions and processes are disclosed for removing sulfur and sulfur compounds from hydrocarbon fuel feedstocks. The feedstock is contacted with a regenerable sorbent such as a compound of the formula $Ti_xCe_yO_2$ where $0<x/y\leq1$ and where $0<x\leq1$ and $0<y\leq1$ capable of selectively adsorbing sulfur compounds present in the hydrocarbon feedstock at about 0° C. to about 100° C. such as at about 25° C.

13 Claims, No Drawings

OXIDATIVELY REGENERABLE ADSORBENTS FOR SULFUR REMOVAL

This invention was made with government support under Contract Nos. N00014-03-M-0336 and N00014-04-C-0284, awarded by The Office of Naval Research. The Government has certain rights in the invention.

FIELD OF THE INVENTION

The disclosed invention relates to adsorbents for removing sulfur and sulfur compounds from liquid and gaseous hydrocarbon streams such as but not limited to gasoline, jet fuel, diesel fuel, naphtha, kerosene, gas oil, vacuum gas oil and cycle oil.

BACKGROUND OF THE INVENTION

Use of ultra deep desulfurization of liquid hydrocarbon fuels such as gasoline, diesel, and jet fuel to satisfy new environmental regulations and fuel cell applications is receiving increased attention worldwide. Conventional hydrodesulfurization (HDS) technology is difficult and costly to use to remove sulfur compounds from liquid hydrocarbon fuels to levels suitable for use in fuel cells, particularly for removal of refractory sulfur compounds such as 4,6-dimethyl-dibenzothiophene (4,6-DMDBT).

Several non-HDS-based desulfurization technologies for use with liquid fuels have been proposed. These technologies include adsorptive desulfurization biodesulfurization, oxidative desulfurization and extraction desulfurization.

Various desulfurization processes are known or have been proposed. For example, U.S. Pat. No. 3,063,936, issued on Nov. 13, 1962 to Pearce et al. discloses that sulfur reduction can be achieved for straight-run naphtha feedstocks from 357 ppmw to 10-26 ppmw levels by hydrotreating at 380° C. using an alumina-supported cobalt molybdate catalyst. According to Pearce et al., a similar degree of desulfurization may be achieved by passing the straight-run naphtha with or without hydrogen, over a contact material comprising zinc oxide, manganese oxide, or iron oxide at 350 to 450° C. Pearce et al. propose to increase sulfur removal by treating the straight run naphtha feeds in a three-stage process in which the hydrocarbon oil is treated with sulfuric acid in the first step, a hydrotreating process employing an alumina-supported cobalt molybdate catalyst is used in the second step, and an adsorption process, preferably using zinc oxide is used for removal of hydrogen sulfide formed in the hydrotreating step as the third step. The process is said to be suitable only for treating feedstocks that are substantially free from ethylenically or acetylenically unsaturated compounds. In particular, Pearce et al. disclose that the process is not suitable for treating feedstocks, such as hydrocarbons obtained as a result of thermal cracking processes that contain substantial amounts of ethylenically or acetylenically unsaturated compounds such as full-range FCC naphtha, which contains about 30% olefins.

A challenge in development of an effective adsorptive desulfurization process is development of an adsorbent which has high sulfur capacity, high selectively to the sulfur compounds over other aromatic and olefinic compounds coexisting in the fuels, and high regenerability and stability during recycle.

A need therefore exists for adsorbents which may be effectively used in adsorptive desulfurization processes.

SUMMARY OF INVENTION

In a first aspect, the disclosed invention relates to novel metal oxide-$CeO_2$-based adsorbents of the formula $MO-CeO_2$ where M is any of Ag, Au, Ba, Be, Ca, Co, Cr, Cu, Fe, Ge, Hf, Ir, La, Mg, Mo, Ni, Os, Pb, Pd, Pt, Rh, Ru, Sc, Sn, Sr, Ti, W, $Y_2$, Zr and mixtures thereof such as $AgO-CeO_2$-based adsorbents such as $Ag_{0.1}Ce_{0.9}O_2$, $AuO-CeO_2$-based adsorbents such as $Au_{0.1}Ce_{0.9}O_2$, $BaO_x-CeO_2$-based adsorbents where $1 \leq x \leq 2$ such as $Ba_{0.1}Ce_{0.9}O_2$, $BeO_x-CeO_2$-based adsorbents where $1 \leq x \leq 2$ such as $Be_{0.1}Ce_{0.9}O_2$, $CaO-CeO_2$-based adsorbents such as $Ca_{0.1}Ce_{0.9}O_2$, $CoO-CeO_2$-based adsorbents such as $Co_{0.1}Ce_{0.9}O_2$, $CrO_x-CeO_2$-based adsorbents where $1 \leq x \leq 3$ such as $Cr_{0.1}Ce_{0.9}O_2$, $CuO-CeO_2$-based adsorbents such as $Cu_{0.1}Ce_{0.9}O_2$, $FeO-CeO_2$-based adsorbents such as $Fe_{0.1}Ce_{0.9}O_2$, $GeO_x-CeO_2$-based adsorbents where $1 \leq x \leq 2$ such as $Ge_{0.1}Ce_{0.9}O_2$, $HfO_x-CeO_2$-based adsorbents where $1 \leq x \leq 2$ such as $Hf_{0.1}Ce_{0.9}O_2$, $IrO_2-CeO_2$-based adsorbents such as $Ir_{0.1}Ce_{0.9}O_2$, $La_2O_3-CeO_2$-based adsorbents such as $La_{0.1}Ce_{0.9}O_2$, $MgO_x-CeO_2$-based adsorbents where $1 \leq x \leq 2$ such as $Mg_{0.1}Ce_{0.9}O_2$, $MoO_x-CeO_2$-based adsorbents where $1 \leq x \leq 3$ such as $Mo_{0.1}Ce_{0.9}O_2$, $NiO-CeO_2$-based adsorbents such as $Ni_{0.1}Ce_{0.9}O_2$, $OsO_2-CeO_2$-based adsorbents such as $Os_{0.1}Ce_{0.9}O_2$, $PbO-CeO_2$-based adsorbents such as $Pb_{0.1}Ce_{0.9}O_2$, $PdO_x-CeO_2$-based adsorbents where $0 < x \leq 1$ such as $Pd_{0.1}Ce_{0.9}O_2$, $PtO_x-CeO_2$-based adsorbents where $0 < x \leq 2$ such as $Pt_{0.1}Ce_{0.9}O_2$, $RhO_x-CeO_2$-based adsorbents where $0 < x \leq 2$ such as $Rh_{0.1}Ce_{0.9}O_2$, $RuO_2-CeO_2$-based adsorbents such as $Ru_{0.1}Ce_{0.9}O_2$, $ScO-CeO_2$-based adsorbents such as $Sc_{0.1}Ce_{0.9}O_2$, $SnO_x-CeO_2$-based adsorbents where $0 < x \leq 2$ such as $Sn_{0.1}Ce_{0.9}O_2$, $SrO-CeO_2$-based adsorbents such as $Sr_{0.1}Ce_{0.9}O_2$, $TiO_2-CeO_2$-based adsorbents such as $Ti_xCe_yO_2$ where $0 < x/y \leq 1$ and where $0 < x \leq 1$ and $0 < y \leq 1$ such as $Ti_{0.1}Ce_{0.9}O_2$, $Ti_{0.5}Ce_{0.5}O_2$, and $Ti_{0.9}Ce_{0.1}O_2$, $WO_3-CeO_2$-based adsorbents such as $W_{0.1}Ce_{0.9}O_2$, $Y_2O_3-CeO_2$-based adsorbents such as $Y_{0.1}Ce_{0.9}O_2$, and $ZrO_x-CeO_2$-based adsorbents where $0 < x \leq 2$ such as $Zr_{0.1}Ce_{0.9}O_2$.

The novel adsorbents have high adsorptive selectivity and capacity for sulfur compounds in the presence of aromatics.

In a second aspect, the invention relates to the use of these novel adsorbents in, such as, devices such as fixed-bed type absorbers, fluidized-bed type absorbers, moving-bed type absorbers, and rotating type absorbers to remove sulfur and sulfur compounds such as thiols, disulfides, sulfides and thiophenic compounds from hydrocarbon streams such as hydrocarbon fuels, lubricant oils and hydrocarbon solvents and mixtures thereof, preferably hydrocarbon fuels such as gasoline, jet fuel, diesel fuel, naphtha, kerosene, gas oil and vacuum gas oil and mixtures thereof.

In this second aspect, a hydrocarbon stream contacts any one or more of the adsorbents over a temperature range of about 0° C. to about 100° C., preferably about 5° C. to about 70° C., more preferably at about 25° C., and at a pressure of about 0.05 MPa to about 0.20 MPa, preferably at about 0.10 MPa to about 0.15 MPa, more preferably at about atmospheric pressure, for a time sufficient to enable the adsorbent to adsorb sulfur and sulfur compounds such as thiols, disulfides, sulfides and thiophenic compounds and mixtures thereof, which may present in the hydrocarbon streams.

Use of these adsorbents to remove any one or more of sulfur and sulfur compounds from the hydrocarbon streams advantageously may be performed without hydrogen to produce clean liquid and gaseous hydrocarbon streams having less than about 1 ppmw sulfur to about 50 ppmw sulfur, typically about 10 ppmw sulfur or less, and clean hydrocarbon fuels having less than about 1 ppmw sulfur to about 50 ppmw sulfur, typically about 1 ppmw sulfur or less. The clean liquid and gaseous hydrocarbon streams may be used for fuel processing as well as directly in fuel cells.

The invention is further described in detail below by reference to the following detailed description and non-limiting examples.

DETAILED DESCRIPTION OF THE INVENTION

Method of Manufacture of Adsorbents

Generally, the novel adsorbents are made by mixing an aqueous solution of a cerium oxide precursor that has a concentration range of about 0.02 M to about 1.0 M, preferably about 0.05 M to about 0.5 M, more preferably about 0.10 M to about 0.20 M with an aqueous metal salt solution that has a concentration range of about 0.002 M to about 0.10 M, preferably about 0.005 M to about 0.05 M, more preferably about 0.01 M to about 0.02 M to form a first solution. Useful aqueous solutions of cerium oxide precursors include but are not limited to any one or more of ammonium cerium nitrate, cerium nitrate hexahydrate, cerium acetylacetonate hydrate, cerium sulfate hydrate, and mixtures thereof. Useful aqueous metal salt solutions include but are not limited to aqueous solutions of a metal oxide precursor such metal chlorite hydrates such as osmium chlorite hydrate, metal nitrate hydrates such as lanthanum nitrate hydrate, ferrous nitrate hydrate, cobalt nitrate hydrate, nickel nitrate hydrate, gold chloride hydrate and mixtures thereof, metal chlorides such as ruthenium chloride, iridium chloride, rhodium chloride, hafnium chloride, tin chloride, germanium chloride, platinum chloride, palladium chloride and mixtures thereof, metal nitrates such as lead nitrate, strontium nitrate, silver nitrate, barium nitrate, beryllium nitrate, calcium nitrate and mixtures thereof, chromium nitrate nonahydrate, ammonium molybdate tetrahydrate, magnesium nitrate hexahydrate, zirconyl nitrate titanium oxysulfate-sulfuric acid complex hydrate and mixtures of any one or more of the above.

The first solution is mixed with an aqueous urea solution that has a concentration range of about 10 M to about 0.1 M, preferably about 2.0 M to about 0.2 M, more preferably about 1.0 M to about 0.5 M to produce a mixed solution. The mixed solution is heated to form precipitates, and then cooled to room temperature to produce a cooled slurry solution. The cooled slurry solution is filtrated to generate precipitates which are heated to form dried precipitates. The dried precipitates then are calcined, such as at about 400° C. to about 600° C. in an oxidizing atmosphere such as air and to produce the adsorbent.

The adsorbents may include one or more oxidation catalysts such as Pt, Pd, $V_2O_5$, CuO, $CrO_x$, $Ag_2O$, $MoO_3$, $WO_3$, MnO, $Nb_2O_5$, CoO, $Fe_2O_5$, ZnO and NiO to accelerate oxidation of the adsorbed sulfur and sulfur compounds and to enable use of lower oxidation temperatures. The catalysts may be present in an amount of about 0.2 wt. % to about 25 wt. %, preferably about 0.5 wt. % to about 2.0 wt. %, based on the weight of the adsorbent. The oxidation catalysts may be incorporated into the adsorbent by loading the catalyst onto adsorbent by, such as, the incipient wetness impregnation method.

Method of Use of Adsorbents

In use, an influent liquid or gaseous hydrocarbon stream to be desulfurized is passed through a bed of adsorbent, such as a fixed bed of the adsorbent to produce a desulfurized hydrocarbon stream. A liquid hydrocarbon stream typically is passed at a temperature of about 0° C. to about 100° C., preferably about 5° C. to about 70° C., more preferably about 20° C. to about 30° C., even more preferably at about 25° C., and at a pressure of about 0.05 MPa to about 0.20 MPa, preferably about 0.10 MPa to about 0.15 MPa, more preferably at about atmospheric pressure. A gaseous influent hydrocarbon stream is passed at a temperature of about 0° C. to about 100° C. and at a pressure of about 0.1 MPa to about 5.0 MPa, preferably about 0.1 MPa to about 10 MPa. Typically, the adsorbent is at a temperature of about 0° C. to about 100° C. Adsorbent saturated with sulfur and sulfurized compounds may be regenerated and then reused.

Regeneration

Regeneration of the saturated adsorbent may be performed by passing an oxidizing agent, such an oxidizing gas or an oxidizing liquid, over the adsorbent. Oxidizing gases which may be used include air, ozone, $N_2O$, $O_2$-containing gas, $N_2O$-containing gas or ozone-containing gas, or mixtures thereof. Oxidizing liquids which may be employed include $H_2O_2$, nitric acid, alkyl hydroperoxides such as tert-butyl hydroperoxide and cumene hydroperoxide, or mixtures thereof.

Oxidizing gases used for regeneration have an oxidizing gas partial pressure of about 5 v % to about 100 v %, preferably about 10 v % to about 90 v %, more preferably about 20 v % to about 80 v %. When an oxidizing gas or gases is passed through the adsorbent, the oxidizing gases are heated to about 100° C. to about 700° C., preferably about 200° C. to about 600° C., more preferably about 350° C. to about 600° C. The oxidizing gases are passed over the adsorbent for a time sufficient to achieve the regeneration, i.e., to remove about 90% or more of adsorbed sulfur and sulfur compounds from the adsorbent. This time is typically about 10 min to about 120 min. During regeneration, the adsorbed sulfur and sulfur compounds react with $O_2$, or ozone or $N_2O$ to form $SO_x$ and $CO_2$ which leave the adsorbent. When oxidizing liquids are used, they typically are at a temperature of about 50° C. to about 300° C., preferably about 80° C. to about 250° C., more preferably about 80° C. to about 200° C. After oxidation by using oxidizing liquids, the adsorbent is dried under a flow of air, $N_2$ or oxygen-containing gas at about 100° C. to about 700° C., preferably about 200° C. to about 600° C., more preferably about 350° C. to about 500° C. After regeneration, the adsorbent is cooled to room temperature for use in a next cycle of adsorptive desulfurization of hydrocarbon streams.

The invention is further described below by reference to the following non-limiting examples.

Example 1

Manufacture of $La_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.8403 g of 99.99% pure lanthanum nitrate hydrate from Aldrich is dissolved in 100 ml deionized water to make 100 mL of 0.0259 M lanthanum nitrate solution.

100 mL of the lanthanum nitrate hydrate complex solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then cooled at 10° C./min to room temperature to produce a cooled slurry solution.

The cooled slurry solution is filtrated to separate the precipitates. The precipitates then are dried at 100° C. under air flow to produce dried precipitates. The dried precipitates are calcined in air flowing at 100 mL/min flow while heating at 1.5° C./min to 450° C. The precipitates are maintained at 450° C. for 6 hours to produce $La_{0.1}Ce_{0.9}O_2$ adsorbent.

Example 2

Manufacture of $Y_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.5795 g of 99.9% pure yttrium nitrate hydrate from Aldrich is dissolved in 100 ml deionized water to make 100 mL of 0.013 M yttrium nitrate solution.

100 mL of the yttrium nitrate hydrate solution is mixed with 100 mL of the ammonium cerium nitrate solution to form a first solution.

All of the first solution is mixed with 800 ml of the aqueous solution and vigorously mixed by magnetic stirrer to produce a mixed solution.

The mixed solution is heated at 2° C./min to 90° C., maintained at 90° C. for 8 hours to produce precipitates, and then cooled at 10° C./min to room temperature to produce a cooled slurry solution. The cooled slurry solution is filtrated to separate the precipitates.

The precipitates then are dried at 100° C. under air flow to produce dried precipitates. The dried precipitates are calcined in air flowing at 100 mL/min flow while heating at 1.5° C./min to 450° C. The precipitates are maintained at 450° C. for 6 hours to yield $Y_{0.1}Ce_{0.9}O_2$ Example 2A Manufacture of $Sc_{0.1}Ce_{0.9}O_2$ Adsorbent Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.388 g of 99% pure scandium nitrate from Aldrich is dissolved in 100 ml deionized water to make 100 mL of 0.017 M scandium nitrate solution. 100 mL of the scandium nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Sc_{0.1}Ce_{0.9}O_2$ adsorbent.

Example 3

Manufacture of $Cu_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.4142 g of 98% pure copper nitrate hydrate from Aldrich is dissolved in 100 ml deionized water to make 100 mL of 0.016 M copper nitrate-solution.

100 mL of the copper nitrate hydrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Cu_{0.1}Ce_{0.9}O_2$ adsorbent.

Example 3A

Manufacture of $Au_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.5663 g of 99.999% pure gold chloride hydrate from Aldrich is dissolved in 100 ml deionized water to make 100 mL of 0.015 M gold chloride solution.

100 mL of the gold chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow. The dried precipitates are calcined in air flowing at 100 mL/min flow while heating at 1.5° C./min to 450° C. The precipitates are maintained at 450° C. for 6 hours to yield $Au_{0.1}Ce_{0.9}O_2$ adsorbent.

Example 4

Manufacture of $Ni_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution. 0.3826 g of 99.999% pure nickel nitrate hydrate from Aldrich is dissolved in 100 ml deionized water to make 100 mL of 0.013 M nickel nitrate solution.

100 mL of the nickel nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow. The dried precipitates are calcined in air flowing at 100 mL/min flow while heating at 1.5° C./min to 450° C. The precipitates are maintained at 450° C. for 6 hours to yield $Ni_{0.1}Ce_{0.9}O_2$ adsorbent.

Example 4A

Manufacture of $Pd_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.2956 g of 99% pure palladium chloride from Aldrich is dissolved in 100 ml deionized to make 100 mL of 0.015 M palladium chloride solution.

100 mL of the palladium chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then cooled at 10° C./min to room temperature to produce a cooled slurry solution. The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Pd_{0.1}Ce_{0.9}O_2$ adsorbent.

Example 4B

Manufacture of $Pt_{0.1}Ce_{0.9}O_2$

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.5614 g of 99% pure platinum chloride from Aldrich is dissolved in 100 ml deionized water to make 100 mL of 0.015 M platinum chloride solution.

100 mL of the platinum chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Pt_{0.1}Ce_{0.9}O_2$ adsorbent.

Example 5

Manufacture of $Ca_{0.1}Ce_{0.9}O_2$ Adsorbent

Urea in an amount of 35 g is placed in a glass beaker, and 800 ml deionized water is added to make 800 ml of 0.728 M aqueous urea solution. 8.22 g of 99.99% pure ammonium cerium nitrate from Aldrich is dissolved in 100 ml deionized water to make 100 mL of 0.149 M ammonium cerium nitrate solution.

0.2612 g of 99% pure calcium nitrate from Aldrich is dissolved in 100 ml deionized water to make 100 mL of 0.014 M calcium nitrate solution.

100 mL of the calcium nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Ca_{0.1}Ce_{0.9}O_2$ adsorbent.

Example 5A

Manufacture of $Be_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.2993 g of 99% pure beryllium nitrate solution from Aldrich is dissolved in 100 ml deionized water to make 100 mL of 0.020 M beryllium nitrate solution.

100 mL of the beryllium nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Be_{0.1}Ce_{0.9}O_2$ adsorbent.

Example 5B

Manufacture of $Mg_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.4274 g of 99% pure magnesium nitrate hexahydrate from Aldrich is dissolved in 100 ml deionized water to make 100 mL of 0.015 M magnesium nitrate solution.

100 mL of the magnesium nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Mg_{0.1}Ce_{0.9}O_2$ adsorbent.

Example 5C

Manufacture of $Ba_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.4356 g of 90% pure barium nitrate hydrate from Aldrich is dissolved in 100 ml deionized water to make 100 mL of 0.015 M barium nitrate solution.

100 mL of the barium nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Ba_{0.1}Ce_{0.9}O_2$ Adsorbent.

Example 6

Manufacture of $Ag_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.7031 g of 99% pure silver nitrate from Aldrich is dissolved in 100 ml deionized water to make 100 mL of 0.037 M silver nitrate solution.

100 mL of the silver nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow. The dried precipitates are calcined in air flowing at 100 mL/min flow while heating at 1.5° C./min to 450° C. The precipitates are maintained at 450° C. for 6 hours to yield $Ag_{0.1}Ce_{0.9}O_2$ adsorbent.

Example 7

Manufacture of $Sr_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.5711 g of 99% pure strontium nitrate from Aldrich is dissolved in 100 ml deionized water to make 100 mL of 0.024 M strontium nitrate solution.

100 mL of the strontium nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow. The dried precipitates are calcined in air flowing at 100 mL/min flow while heating at 1.5° C./min to 450° C. The precipitates are maintained at 450° C. for 6 hours to yield $Sr_{0.1}Ce_{0.9}O_2$ adsorbent.

Example 8

Manufacture of $Pb_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

1.3506 g of 99% pure lead nitrate from Aldrich is dissolved in 100 ml deionized water to make 100 mL of 0.036 M lead nitrate solution.

100 mL of the lead nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow. The dried precipitates are calcined in air flowing at 100 mL/min flow while heating at 1.5° C./min to 450° C. The precipitates are maintained at 450° C. for 6 hours to yield $Pb_{0.1}Ce_{0.9}O_2$ adsorbent.

Example 8A

Manufacture of $Ge_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.3574 g of germanium chloride from Aldrich is dissolved in 100 ml deionized water to make 100 mL of 0.015 M germanium chloride solution.

100 mL of the germanium chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Pd_{0.1}Ce_{0.9}O_2$ adsorbent.

Example 8B

Manufacture of $Sn_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.4342 g of 98% pure tin chloride from Aldrich is dissolved in 100 ml deionized water to make 100 mL of 0.015 M tin chloride solution.

100 mL of the tin chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution. The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Sn_{0.1}Ce_{0.9}O_2$ adsorbent.

Particularly preferred adsorbents are $TiO_2$—$CeO_2$ based adsorbents of the formula $Ti_xCe_yO_2$, where $0<x/y\leq 1$ and where $0<x<1$ and $0<y<1$.

Example 9

Manufacture of $Ti_{0.1}Ce_{0.9}O_2$ Adsorbent

Urea in an amount of 35 g is placed in a glass beaker, and 800 ml deionized water is added to make 800 ml of 0.728 M aqueous urea solution. 8.22 g of 99.99% pure ammonium cerium nitrate from Aldrich is dissolved in 100 ml deionized water to make 100 mL of 0.149 M ammonium cerium nitrate solution.

0.3120 g of synthesis grade titanium oxysulfate-sulfuric acid complex hydrate from Aldrich is dissolved in 100 ml deionized water over a period of 1.5 hours to make 100 mL of titanium oxysulfate-sulfuric acid solution.

100 mL of the titanium oxysulfate-sulfuric acid complex hydrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow to produce dried precipitates. The dried precipitates are calcined in air flowing at 100 mL/min flow while heating at 1.5° C./min to 450° C. The precipitates are maintained at 450° C. for 6 hours to yield $Ti_{0.1}Ce_{0.9}O_2$ adsorbent.

Example 9A

Manufacture of $Zr_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolve in 100 ml deionized water to make 100 mL of 0.149 M ammonium cerium nitrate solution.

0.3854 g of 99% pure zirconyl nitrate from Aldrich is dissolved in 100 ml deionized water to make 100 mL of 0.015 M zirconyl nitrate solution.

100 mL of the zirconyl nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Zr_{0.1}Ce_{0.9}O_2$ adsorbent.

Example 9B

Manufacture of $Hf_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.5338 g of 98% pure hafnium chloride from Aldrich is dissolved in 100 ml deionized water to make 100 mL of 0.015 M hafnium chloride solution.

100 mL of the hafnium chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Hf_{0.1}Ce_{0.9}O_2$ adsorbent.

Example 10

Manufacture of $Co_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.3842 g of 99% pure cobalt nitrate hydrate from Aldrich is dissolved in 100 ml deionized water to make 100 mL of 0.013 M cobalt nitrate solution.

100 mL of the cobalt nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow to produce dried precipitates. The dried precipitates are calcined in air flowing at 100 mL/min flow while heating at 1.5° C./min to 450° C. The precipitates are maintained at 450° C. for 6 hours to yield $Co_{0.1}Ce_{0.9}O_2$ adsorbent.

Example 10A

Manufacture of $Rh_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution. 0.3488 g of 98% pure rhodium chloride from Aldrich is dissolved in 100 ml deionized to make 100 mL of 0.015 M rhodium chloride solution.

100 mL of the rhodium chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Rh_{0.1}Ce_{0.9}O_2$ adsorbent.

Example 10B

Manufacture of $Ir_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.4976 g of 99.9% pure iridium chloride from Aldrich is dissolved in 100 ml deionized water to make 100 mL of 0.015 M iridium chloride solution.

100 mL of the iridium chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Ir_{0.1}Ce_{0.9}O_2$ adsorbent.

Example 11

Manufacture of $Fe_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.3640 g of 99% pure iron nitrate hydrate from Aldrich is dissolved in 100 ml deionized water to make 100 mL of 0.015M ferrous nitrate solution.

100 mL of the iron nitrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow to produce dried precipitates. The dried precipitates are calcined in air flowing at 100 mL/min flow while heating at 1.5° C./min to 450° C. The precipitates are maintained at 450° C. for 6 hours to yield $Fe_{0.1}Ce_{0.9}O_2$ adsorbent.

Example 11A

Manufacture of $Ru_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.3457 g of 99.98% pure ruthenium chloride from Aldrich is dissolved in 100 ml deionized water to make 100 mL of 0.015 M ruthenium chloride solution.

100 mL of the ruthenium chloride solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $R4_{0.1}Ce_{0.9}O_2$ adsorbent.

Example 11B

Manufacture of $Os_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.4493 g of 95% osmium chloride hydrate from Aldrich is dissolved in 100 ml deionized water to make 100 mL of 0.015 M osmium chloride solution.

100 mL of the osmium chlorite hydrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Os_{0.1}Ce_{0.9}O_2$ adsorbent.

Example 12

Manufacture of $W_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.1406 g of 99.99% pure ammonium metatungstate hydrate from Aldrich is dissolved in 100 ml deionized water to make 100 mL of 0.015 M W-containing solution.

100 mL of the W-containing solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates then are dried at 100° C. under air flow to produce dried precipitates. The dried precipitates are calcined in air flowing at 100 mL/min flow while heating at 1.5° C./min to 450° C. The precipitates are maintained at 450° C. for 6 hours to yield $W_{0.1}Ce_{0.9}O_2$ adsorbent.

Example 12A

Manufacture of $Mo_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate solution.

0.2943 g of 99.98% pure ammonium molybdate tetrahydrate from Aldrich is dissolved in 100 ml deionized water to make 100 mL of 0.015 M ammonium molybdate tetrahydrate solution. 100 mL of the ammonium molybdate tetrahydrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Mo_{0.1}Ce_{0.9}O_2$ adsorbent.

Example 12B

Manufacture of $Cr_{0.1}Ce_{0.9}O_2$ Adsorbent

Urea in an amount of 35 g is placed in a glass beaker, and 800 ml deionized water is added to make 800 ml of 0.728 M aqueous urea solution.

8.22 g of 99.99% pure ammonium cerium nitrate from Aldrich is dissolved in 100 ml deionized water to make 100 mL of 0.149 M ammonium cerium nitrate.

0.670 g of 99% pure chromium nitrate nonahydrate from Aldrich is dissolved in 100 ml deionized to make 100 mL of 0.015M chromium nitrate solution.

100 mL of the nitrate nonahydrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and then, cooled at 10° C./min to room temperature to produce a cooled slurry solution.

The cooled slurry solution is filtrated to separate the precipitates. The precipitates are dried at 100° C. under air flow. The dried precipitates are calcined in air flowing at 100 mL/min flow while heating at 1.5° C./min to 450° C. The precipitates are maintained at 450° C. for 6 hours to yield $Cr_{0.1}Ce_{0.9}O_2$ adsorbent Adsorption Performance During adsorption tests of the adsorbents of Examples 1-12, model fuel (I) having the composition shown in Table A is passed at a flow rate of 0.05 mL/min over 1 g of adsorbent in a bed having the dimensions of 4.6 mm (ID)×37.5 mm (length) at room temperature (25° C.) and $4.8^{-1}$ LHSV (liquid hour space velocity).

The sulfur breakthrough capacity (mg-S/Ads-g) at sulfur levels of 1 ppmw and 30 ppmw, respectively, are measured by analyzing sulfur concentration at the outlet of the bed using gas chromatography—with a flame ionization detector ("GC-FID").

The adsorptive breakthrough capacities of the adsorbents at sulfur levels of 1 ppmw and 30 ppmw, respectively, are shown in Table 1.

TABLE A

Model fuel (I) composition

| Compound | S conc. (ppmw) | Mol conc. (%) |
|---|---|---|
| Sulfur | | |
| Thiophene (T) | 110 | 0.034 |
| Tetrahydrothiophene (THT) | 95 | 0.030 |
| 2-methyl benzothiophene (2MBT) | 115 | 0.036 |
| Benzothiophene (BT) | 100 | 0.031 |
| Aromatics | | |
| Toluene | | 0.033 |
| Olefin | | |
| 1-$C_8$ | | 0.033 |
| Internal standard (IS) | | |
| n-$C_9$ | | 0.033 |
| Solvent | | |
| n-$C_7$ | | 99.770 |

TABLE 1

| Example | Adsorbent | Capacity: mg-S/Ads.-g (<1 ppmw) | Capacity: mg-S/Ads.-g (<30 ppmw) |
|---|---|---|---|
| 1 | $La_{0.1}Ce_{0.9}O_2$ | 0.00 | 0.00 |
| 2 | $Y_{0.1}Ce_{0.9}O_2$ | 0.00 | 0.00 |
| 3 | $Cu_{0.1}Ce_{0.9}O_2$ | 0.19 | 0.33 |
| 4 | $Ni_{0.1}Ce_{0.9}O_2$ | 0.00 | 0.38 |
| 5 | $Ca_{0.1}Ce_{0.9}O_2$ | 0.00 | 0.07 |

TABLE 1-continued

| Example | Adsorbent | Capacity: mg-S/Ads.-g (<1 ppmw) | Capacity: mg-S/Ads.-g (<30 ppmw) |
|---|---|---|---|
| 6 | $Ag_{0.1}Ce_{0.9}O_2$ | 0.20 | 0.36 |
| 7 | $Sr_{0.1}Ce_{0.9}O_2$ | 0.00 | 0.07 |
| 8 | $Pb_{0.1}Ce_{0.9}O_2$ | 0.00 | 0.00 |
| 9 | $Ti_{0.1}Ce_{0.9}O_2$ | 0.55 | 0.86 |
| 10 | $Co_{0.1}Ce_{0.9}O_2$ | 0.22 | 0.48 |
| 11 | $Fe_{0.1}Ce_{0.9}O_2$ | 0.00 | 0.28 |
| 12 | $W_{0.1}Ce_{0.9}O_2$ | 0.98 | 0.98 |

The adsorption capacities of the fresh and regenerated $Ti_{0.1}Ce_{0.9}O_2$ adsorbents of Example 9 also are measured in a fixed-bed flow system. Adsorption by the fixed-bed flow system entails first pretreating a fixed bed of the adsorbent by passing air/$O_2$ which contains oxygen in an amount of 21 vol. % at a flow rate of 100 ml/min through the adsorbent while increasing the temperature of the adsorbent to 350° C. for 2 hours to activate the adsorbent. The adsorbent then is cooled to room temperature under air/$O_2$ flow at 100 ml/min with heat turned off.

The adsorption is conducted at LHSV: 4.8 $h^{-1}$ and room temperature using model fuel (I) feedstock. The spent adsorbents are regenerated by the procedure: 1) passing air at a flow rate of 100 ml/min through the adsorbent bed for 10 min; 2) increasing the temperature of the adsorbent bed to 375° C. at a rate of 15° C./min under 100 ml/min air flow; 3) holding at 375° C. for 120 min, and 4) cooling the temperature to room temperature under the air flow. Adsorption then again is conducted at LHSV: 4.8 $h^{-1}$ and room temperature using model fuel (I). The adsorption capacity results for the fresh and regenerated adsorbents at sulfur levels of 1 ppmw and 30 ppmw, respectively, are shown in Table 2.

TABLE 2

| Cycles | Sample | Capacity: mg-S/Ads.-g (<1 ppmw) | Capacity: mg-S/Ads-g (<30 ppmw) |
|---|---|---|---|
| 1 | Fresh Adsorbent | 2.3 | 3.3 |
| 2 | Regenerated Adsorbent | 2.5 | 2.9 |

Example 13

$Ti_{0.1}Ce_{0.9}O_2$ Adsorbent Doped with 1 wt % of Pd Oxidation Catalyst 1 wt. % Pd doped $Ti_{0.1}Ce_{0.9}O_2$ adsorbent is prepared by loading Pd onto the $Ti_{0.1}Ce_{0.9}O_2$ of example 9 by using the incipient wetness impregnation method. In this method, a Pd doping solution is prepared by dissolving 0.213 g of >99% pure tetrammine palladium (II) nitrate from Aldrich in 12.34 mL of deionized water. All of this solution is mixed with 11.5 gm of the precipitates dried at 450 C for 6 hours as in Example 9 to form Pd impregnated samples. The Pd impregnated samples are dried at 100° C. overnight to yield $Ti_{0.1}Ce_{0.9}O_2$ adsorbent doped with 1 wt % of Pd.

The adsorption capacities of fresh and regenerated 1 wt. % Pd doped $Ti_{0.1}Ce_{0.9}O_2$ adsorbent are evaluated in the fixed-bed flow system. Adsorption is conducted at room temperature and 1.2 $h^{-1}$ of LHSV. Model fuel (II) having the composition shown in Table B is used for these tests. Regeneration is conducted at 375° C. under an air flow of 100 mL/min for 2 hrs at sulfur levels of 1 ppmw and 30 ppmw, respectively. The results are shown in Table 3.

TABLE B

Model fuel (II) composition

| Compound | S conc. (ppmw) | Mol conc. (%) |
|---|---|---|
| Sulfur | | |
| Thiophene (T) | 50 | 0.021 |
| 2-methylthiophene (2MT) | 50 | 0.021 |
| 3-methylthiophene (3MT) | 50 | 0.021 |
| 2,5-dimethylthiophene (2,5-DMT) | 50 | 0.021 |
| Benzothiophene (BT) | 60 | 0.025 |
| Solvent | | |
| Iso-octane | | 99.893 |

TABLE 3

| Cycles | Sample | Capacity: mg-S/Ads.-g (<1 ppmw) | Capacity: mg-S/Ads-g (<30 ppmw) |
|---|---|---|---|
| $1^{st}$ | Fresh | 2.8 | 2.8 |
| $2^{nd}$ | Reg. @ 375° C., 2 h | 2.7 | 2.7 |
| $3^{rd}$ | Reg. @ 375° C., 2 h | 2.4 | 2.9 |

Example 14

Manufacture of $Ti_{0.5}Ce_{0.5}O_2$ Adsorbent

Urea in an amount of 75 g is placed in a glass beaker, and 800 ml deionized water is added to make 800 ml of 1.56 M aqueous urea solution.

32.9 g of 99.99% pure ammonium cerium nitrate from Aldrich is dissolved in deionized water to make 100 mL of 0.60 M ammonium cerium nitrate solution.

18.0 g of synthesis grade titanium oxysulfate-sulfuric acid complex hydrate from Aldrich is dissolved in deionized water over a period of 1.5 hours to make 100 mL of 0.60 M titanium oxysulfate-sulfuric acid complex hydrate solution.

100 mL of the titanium oxysulfate-sulfuric acid complex hydrate solution is mixed with 100 mL of the ammonium cerium nitrate solution to form a first solution.

All of the first solution is mixed with 800 ml of the aqueous solution and vigorously mixed by magnetic stirrer to produce a mixed solution. The mixed solution is heated at 2° C./min to 90° C., maintained at 90° C. for 8 hours to produce precipitates, and cooled at 10° C./min to room temperature to produce a cooled slurry solution.

The cooled slurry solution is filtrated to separate precipitates. The precipitates are dried at 100° C. under air flow to produce dried precipitates. The dried precipitates are calcined in air flowing at 100 mL/min flow while heating at 1.5° C./min to 450° C. The precipitates are maintained at 450° C. for 6 hours to yield $Ti_{0.5}Ce_{0.5}O_2$ adsorbent.

Example 15

Manufacture of $Ti_{0.9}Ce_{0.1}O_2$ Adsorbent

Urea in an amount of 75 g is placed in a glass beaker, and 800 ml deionized water is added to make 800 ml of 1.56 M aqueous urea solution. 8.22 g of 99.99% pure ammonium cerium nitrate from Aldrich is dissolved in deionized water to make 100 mL of 0.149 M ammonium cerium nitrate solution.

32.7 g of synthesis grade Titanium oxysulfate-sulfuric acid complex hydrate from Aldrich is dissolved in deionized water over a period of 1.5 hours to make 100 mL of 1.215 M Ti oxysulfate-sulfuric acid complex hydrate solution.

100 mL of the titanium oxysulfate-sulfuric acid complex hydrate solution is mixed with 100 mL of the ammonium cerium nitrate solution to form a first solution. All of the first solution is mixed with 800 ml of the urea aqueous solution and vigorously mixed by magnetic stirrer to produce a mixed solution.

The mixed solution is heated at 2° C./min to 90° C., maintained at 90° C. for 8 hours to produce precipitates, and then cooled at 10° C./min to room temperature to produce a cooled slurry solution. The cooled slurry solution is filtrated to separate precipitates. The precipitates are dried at 100° C. under air flow to produce dried precipitates. The dried precipitates are calcined in air flowing at 100° C. mL/min flow while heating at 1.5° C./min to 450° C. The precipitates are maintained at 450° C. for 6 hours to yield $Ti_{0.9}Ce_{0.1}O_2$ adsorbent.

The adsorption capacities of the adsorbents of examples 9, 14 and 15 are evaluated in the fixed-bed flow system. The adsorption is conducted at room temperature and 1.2 $h^{-1}$ of LHSV using a light JP-8 fuel, which contains 373 ppmw of sulfur compounds, mainly alkylated benzothiophenes. The adsorptive breakthrough capacities of the adsorbents at sulfur levels of 1 and 30 ppmw, respectively, are shown in Table 4.

TABLE 4

| Example | Adsorbent | Fuel | Capacity: mg-S/Ads.-g (<1 ppmw) | Capacity: mg-S/Ads.-g (<30 ppmw) |
|---|---|---|---|---|
| 9 | $Ti_{0.1}Ce_{0.9}O_2$ | Light JP-8 | 0.04 | 0.23 |
| 14 | $Ti_{0.5}Ce_{0.5}O_2$ | Light JP-8 | 0.31 | 0.85 |
| 15 | $Ti_{0.9}Ce_{0.1}O_2$ | Light JP-8 | 2.01 | 3.26 |

For comparison of performance of the novel adsorbents with known metal oxide adsorbents, all of the adsorbents, before evaluation, are dried in an oven at 100° C. overnight. Then, 5 g of model fuel (III) having the composition shown in Table C is poured into a glass vial having 0.5 g of the adsorbent. Adsorption is conducted under stirring for 120 min. at room temperature and ambient pressure. After adsorption, the treated fuel is filtered, and total sulfur concentration in the treated fuel is analyzed by an ANTEK 9000 Total Sulfur Analyzer. This procedure is repeated three times for each adsorbent. The average of the results for each adsorbent is shown in Table 5.

TABLE C

Model fuel (III) composition

| Compound | S conc. (ppmw) | Mol conc. (mmol/kg) | Mol conc. (mmol/L) |
|---|---|---|---|
| Sulfur | | | |
| Tetrahydrothiophene (THT) | 106.7 | 3.333 | 2.543 |
| Benzothiophene (BT) | 100.8 | 3.149 | 2.403 |
| 2-methyl benzothiophene (2MBT) | 105.6 | 3.299 | 2.517 |
| Dibenzothiophene (DBT) | 100.4 | 3.137 | 2.393 |
| 4,6-dimethyl benzothiophene (4,6DMDBT) | 100.5 | 3.140 | 2.396 |
| Aromatics | | | |
| Naphthalene (Na) | | 3.148 | 2.402 |
| 1-methyl naphthalene (1MNa) | | 3.211 | 2.450 |
| Phenanthrene (PNT) | | 3.138 | 2.394 |

TABLE C-continued

Model fuel (III) composition

| Compound | S conc. (ppmw) | Mol conc. (mmol/kg) | Mol conc. (mmol/L) |
|---|---|---|---|
| Olefin | | | |
| 1-$C_8$ Internal standard (IS) | | 3.204 | 2.445 |
| n-$C_{10}$ Solvent | | 3.338 | 2.547 |
| n-$C_{14}$ + n-$C_{12}$ | — | — | |

TABLE 5

| Adsorbents | Capacity (mg-S/g-Ads.) |
|---|---|
| MgO | 4.22 |
| CaO | 0.48 |
| SrO | 0.71 |
| $Y_2O_3$ | 0.01 |
| $La_2O_3$ | 0.06 |
| $TiO_2$ | 0.14 |
| $ZrO_2$ | 0.30 |
| $V_2O_5$ | 1.31 |
| $Nb_2O_5$ | 0.03 |
| $CrO_3$ | 1.27 |
| $Cr_2O_3$ | 3.37 |
| MoO | 0.37 |
| $WO_2$ | 0.19 |
| MnO | 0.04 |
| $Fe_2O_3$ | 0.71 |
| $RuO_2$ | 2.44 |
| CoO | 0.80 |
| NiO | 1.69 |
| PdO | 1.78 |
| CuO | 0.39 |
| $Ag_2O$ | 0.24 |
| ZnO | 0.14 |
| $Al_2O_3$ | 5.04 |
| $Ga_2O_3$ | 0.0 |
| PbO | 0.06 |
| $Bi_2O_3$ | 0.05 |
| $Ti_{0.9}Ce_{0.1}O_2$.* | 7.32 |

*Adsorbent of Example 15

Example 16

Manufacture of Ti—Ce—Al—O Adsorbent

Urea in an amount of 60.00 g is transferred to a glass beaker; deionized water in an amount of 500 mL is added to make 500 mL of 1.998 M aqueous urea solution.

32.32 g of synthesis grade titanium oxysulfate-sulfuric acid complex hydrate from Aldrich is mixed with 100 ml deionized water to form a 1.077M titanium oxysulfate-sulfuric acid complex solution.

6.58 g of 99.9% pure ammonium cerium nitrate from Aldrich is mixed with 100 ml deionized water to make 100 mL of 0.120 M ammonium cerium nitrate solution.

10.04 g of 98% pure aluminum nitrate nonahydrate from Aldrich is mixed with 100 ml deionized water to make 100 ml of 0.262 M aluminum nitrate nonahydrate solution.

All the titanium oxysulfate-sulfuric acid complex solution, ammonium cerium nitrate solution and aluminum nitrate nonahydrate solution are mixed with 500 ml of the aqueous urea solution for form a mixed solution. Deionized water is added to the solution to achieve a total volume of 1000 mL of the solution, and stirred vigorously by magnetic stirrer.

The mixed solution then is heated at 2° C./min to a temperature of 95° C., maintained at 95° C. for 6 hours to produce precipitates, and then cooled at 1° C./min down to room temperature to produce a cooled slurry solution. The cooled slurry solution is filtrated to remove the precipitates. The precipitates then are dried at 110° C. in an oven under air flow to produce dried precipitates. After drying, the precipitates are calcined under 100 mL/min of air flow at a heating rate of 1° C./min to 500° C., and maintained at 500° C. for 4 hours to produce adsorbent. The composition of the adsorbent is shown in Table 6. The adsorbent has a particle size range of 0.1 micron to 30 micron, a pore size range of 0.001 micron to 0.01 micron, and a porosity of 10 vol. % to 70 vol. %.

Example 17

Manufacture of Ti—Ce—Al—Ag—O Adsorbent

Urea in an amount of 60.00 g is transferred to a glass beaker; deionized water in an amount of 500 mL is added to make a 1.998 M aqueous urea solution.

32.32 g of synthesis grade titanium oxysulfate-sulfuric acid complex hydrate from Aldrich is mixed with 100 ml deionized water to form a 1.077M titanium oxysulfate-sulfuric acid complex hydrate solution.

6.58 g of 99.9% pure ammonium cerium nitrate from Aldrich is mixed with 100 ml deionized water to make 100 mL of 0.120 M ammonium cerium nitrate solution.

10.04 g of 98% pure aluminum nitrate nonahydrate from Aldrich is mixed with 100 ml deionized water to make 100 ml of 0.262M an aluminum nitrate solution.

4.95 g of 99% pure silver nitrate from Aldrich is mixed with 100 ml deionized water to make 100 mL of 0.288M silver nitrate solution.

All the titanium oxysulfate-sulfuric acid complex solution, ammonium cerium nitrate solution, aluminum nitrate solution and silver nitrate solutions are mixed with 500 ml of the urea solution to make a reaction solution. Deionized water is added to the reaction solution to achieve a total volume of 1000 mL of reaction solution, and stirred vigorously by magnetic stirrer.

The reaction solution then is heated at 2° C./min to a temperature of 95° C., maintained at 95° C. for 6 hours to produce precipitates, and then cooled at 1° C./min to room temperature to produce a cooled slurry solution.

The cooled slurry solution then is subjected to filtration to remove the precipitates. The precipitates then are dried at 110° C. in an oven under air flow to produce dried precipitates. The dried precipitates are calcined under 100 mL/min of air flow at a heating rate of 1° C./min to 500° C., and maintained at 500° C. for 4 hours to produce adsorbent. The composition of the calcined precipitates is shown in Table 6. The adsorbent has a particle size range of 0.1 micron to 30 micron, a pore size 0.001 micron to 0.1 micron, and a porosity of 10 vol. % to 70 vol. %.

TABLE 6

| | Metal oxide weight percentage (wt %) | | | |
|---|---|---|---|---|
| Adsorbent | $Ag_2O$ | $Al_2O_3$ | $TiO_2$ | $CeO_2$ |
| Example 15 | | | 80.7 | 19.3 |
| Example 16 | | 11.1 | 71.7 | 17.2 |
| Example 17 | 21.7 | 8.7 | 56.1 | 13.5 |

The sulfur adsorption capacities of the fresh adsorbents and regenerated adsorbents of examples 15-17 are evaluated by the batch system. Adsorption by the batch system entails first heating the adsorbent from room temperature to 300° C. at 1.5° C./min in an oven, maintaining the adsorbent at 300°

C. for 2 hours, and cooling to room temperature at 10° C./min to produce a pretreated adsorbent.

Model fuel (IV) having the composition shown in Table D is added to the pretreated adsorbent and placed into a batch adsorption reactor. The adsorbent is stirred in the fuel for 2 hours at room temperature and ambient atmosphere. The resulting treated fuel and adsorbent are separated from each other by centrifuge.

The treated fuel is analyzed by an HP 5890 gas chromatograph with a flame ionization detector (FID) and an Antek 9000S total sulfur analyzer. The spent adsorbent is regenerated in an oven in the air flowing at the rate of 80 mL/min while heating the adsorbent from room temperature to 500° C. at 2° C./min and then maintaining the adsorbent at 500° C. for 4 hours to produce regenerated adsorbent. The adsorbent then is cooled to room temperature under the air flow.

The adsorptive capacities of the fresh and regenerated adsorbents are shown in Table 7. The spent adsorbents are regenerated by increasing the adsorbent-bed temperature to 500° C. at 5° C./min and maintaining at 500° C. for 2 hours under an airflow rate of 20 ml/min. The adsorptive capacities of the regenerated adsorbents treated according to this procedure are also shown in Table 7 with the symbol*.

TABLE D

Model fuel (IV) composition

| Chemicals | Purity (g/g) | Concentration wt. % | Concentration ppmw S | Molar concentration (mmol/kg) |
|---|---|---|---|---|
| Sulfur compounds | | | | |
| Tetrahydrothiophene | 0.99 | 0.03 | 105 | 3.3 |
| Benzothiophene | 0.99 | 0.04 | 100 | 3.1 |
| 2-MBT | 0.97 | 0.05 | 100 | 3.1 |
| DBT | 0.98 | 0.06 | 100 | 3.1 |
| 4,6-DMDBT | 0.97 | 0.07 | 100 | 3.1 |
| Total | | | 505 | |
| Aromatics | | | | |
| Naphthalene | 0.99 | 0.04 | | 3.1 |
| 1-Methylnaphthalene | 0.97 | 0.04 | | 3.1 |
| Phenanthrene | 0.98 | 0.06 | | 3.1 |
| Olefin | | | | |
| 1-Octene | 0.98 | 0.04 | | 3.1 |
| Alkanes | | | | |
| n-Dodecane | 0.99 | 0.05 | | 3.1 |
| n-Decane | 0.99 | 49.76 | | |
| n-Hexadecane | 0.99 | 49.76 | | |
| Total | | 100.00 | | |

TABLE 7

| | Sulfur adsorptive capacity (mg-S/g-Ads.) | | | | |
|---|---|---|---|---|---|
| Adsorbents | Fresh | Regen.-1st | Regen.-2nd | Regen.-3rd | Regen.-4th |
| Example 16 | 3.6 | 1.6* | 1.7* | 1.4* | 3.4 |
| Example 17 | 4.1 | 4.0 | 3.8 | 3.7 | |

*The adsorbents are regenerated from room temperature to 500° C. at a temperature ramp of 5° C./min and keep final temperature for 2 hours. The air flow rate of 20 ml/min is used.

The adsorption capacities of the adsorbents of examples 15, 16 and 17 for real fuel JP-5 with 1040 ppmw of sulfur also are evaluated in the batch system described above. The adsorptive capacities of the adsorbents are shown in Table 8.

TABLE 8

| Adsorbents | Sulfur adsorptive capacity (mg-S/g-Ads.) |
|---|---|
| Example 15 | 0.8 |
| Example 16 | 1.8 |
| Example 17 | 5.7 |

The adsorption capacities of the adsorbents of examples 15, 16 and 17 for real fuel JP-5 with 1040 ppmw of sulfur are also evaluated in the fixed-bed flow system. The adsorption is conducted at room temperature and 1.2 h$^{-1}$ of LHSV. The adsorptive capacities of the adsorbents at different breakthrough sulfur levels are shown in Table 9.

TABLE 9

| | Sulfur adsorptive capacity (mg-S/g-Ads.) | | | |
|---|---|---|---|---|
| Adsorbent | <1 ppmw* | <10 ppmw* | <30 ppmw* | 5 hours adsorption |
| Example 15 | 0.90 | 1.77 | 2.20 | 4.96 |
| Example 16 | 2.03 | 3.47 | 3.82 | 6.93 |
| Example 17 | 0.30 | 1.50 | 2.10 | 5.09 |

*The breakthrough sulfur level

The invention claimed is:

1. A method for removing sulfur compounds from a hydrocarbon fuel feedstock comprising,
   contacting the feedstock with a regenerable adsorbent material capable of selectively removing sulfur compounds present in the hydrocarbon feedstock wherein the contacting is performed at a temperature of about 0° C. to about 100° C. at a pressure of about 0.05 MPa to about 0.20 MPa and wherein the regenerable sorbent material comprises a compound of the formula $Ti_xCe_yO_2$ where $0<x/y\leq1$ and where $0<x\leq1$ and $0<y\leq1$.

2. The method of claim 1 where x/y=0.1/0.9.

3. The method of claim 1 where x/y=0.5/0.5.

4. The method of claim 1 where the adsorbent further comprises Pd.

5. The method of claim 1 where the temperature is about 5° C. to about 70° C. and the pressure is about 0.10 MPa to about 0.15 MPa.

6. The method of claim 1 where the temperature is about 25° C.

7. A compound suitable for selectively adsorbing sulfur compounds from a hydrocarbon fuel feedstock over a temperature range of about 0° C. to about 100° C. wherein the compound has the formula $Ti_xCe_yO_2$ where $0<x/y\leq1$ and where $0<x\leq1$ and $0<y\leq1$.

8. The compound of claim 7 where x/y=0.1/0.9.

9. The compound of claim 8 where the adsorbent further comprises Pd.

10. The compound of claim 7 where x/y=0.5/0.5.

11. A compound suitable for selectively adsorbing sulfur compounds from a hydrocarbon fuel feedstock over a temperature range of about 0° C. to about 100° C. wherein the compound comprises a compound of the formula $MO-CeO_2$ where M is any of Ag, Au, Ba, Be, Ca, Co, Cr, Cu, Fe, Ge, Hf, Ir, La, Mg, Mo, Ni, Os, Pb, Pd, Pt, Rh, Ru, Sc, Sn, Sr, Ti, W, Y, Zr and mixtures thereof, wherein the compound of the formula $MO-CeO_2$ is either $Ti_{0.1}Ce_{0.9}O_2$ or $W_{0.1}Ce_{0.9}O_2$.

12. The compound of claim 11 wherein the temperature is about 5° C. to about 70° C. and the pressure is about 0.10 MPa to about 0.15 MPa.

13. The compound of claim 11 wherein the temperature is about 25° C.

* * * * *